Figure 1:
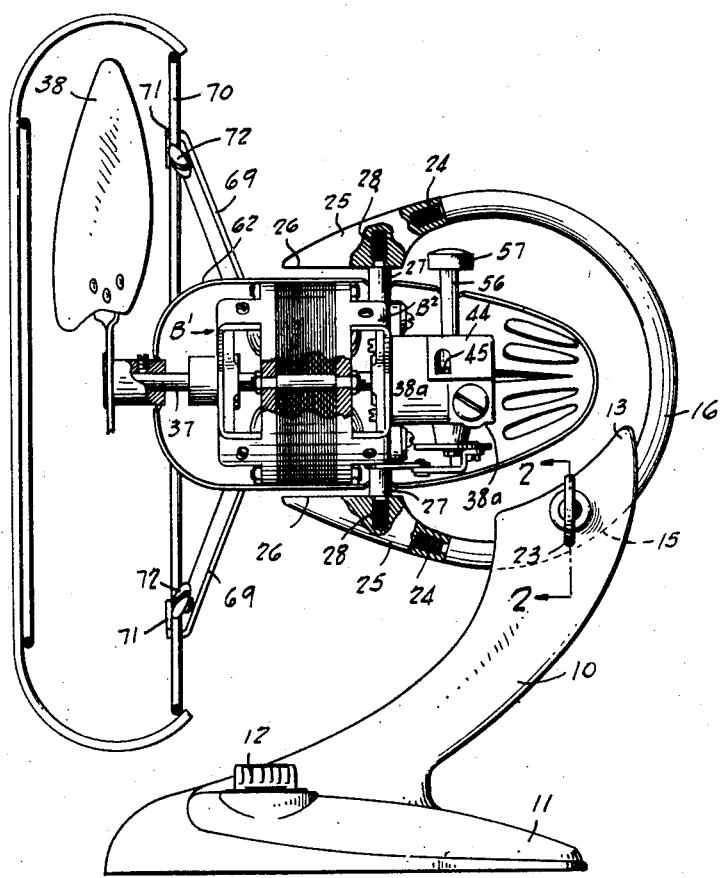

July 25, 1939.  P. J. FITZGERALD  2,166,987

ELECTRIC FAN

Filed May 7, 1938  2 Sheets-Sheet 1

INVENTOR.
Patrick J. Fitzgerald.
BY Joshua R H Potts
ATTORNEY.

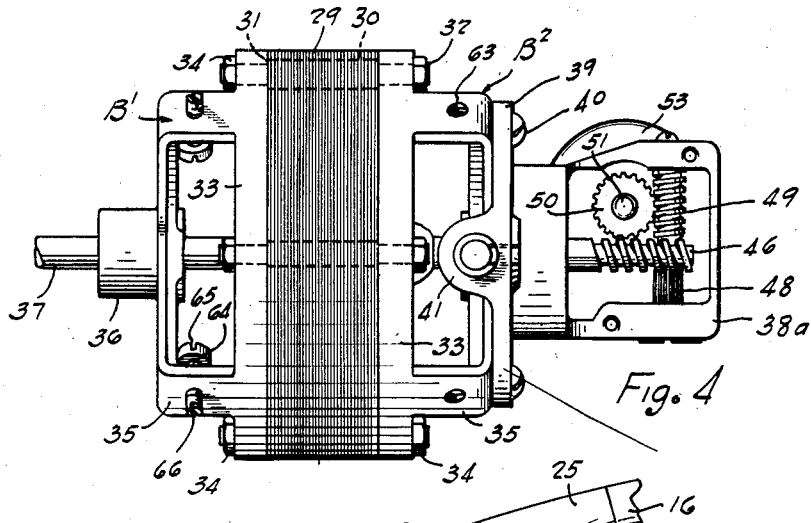

Patented July 25, 1939

2,166,987

UNITED STATES PATENT OFFICE 2,166,987

ELECTRIC FAN

Patrick J. Fitzgerald, Torrington, Conn., assignor to The Fitzgerald Manufacturing Company, Torrington, Conn., a corporation of Connecticut Application May 7, 1938, Serial No. 206,558

4 Claims. (Cl. 230—256)

This invention has to do with electric fans and is concerned primarily with an electric fan designed for oscillation in the usual manner An electric fan of the type with which this invention is concerned includes the usual rotor and stator with the latter carrying the windings of insulated wire in the manner recognized as conventional in the electric arts. The rotor is carried by the shaft and an important phase of the present invention is the manner of assembling bracket elements with the stator to provide bearings in proper alignment, and which bearings receive the said shaft.

More in detail this invention has in view the provision of an electric fan of the character above noted in which a plurality of stud screws extend through the stator and are formed at points adjacent each of their ends with shoulders. The extremities of the stud screws are threaded and bracket elements are clamped against the shoulders by nuts screwed on the threaded extremities. Thus, by accurately machining the stud screws, definite assurance may be had that the bearings carried by the brackets are in a properly aligned relationship.

Another object of the invention is the provision of a novel casing structure for the motor and associated mechanism. Having in mind ease of manufacture and simplicity of assembly, the invention has in view the provision of an electric fan including a motor as above noted which is housed in a two part casing which may be of any appropriate design, but which preferably snugly encompasses the stator and associated bracket mechanism. The parts of this casing may be anchored to the bracket structure to maintain them in assembled relationship.

Another important object of the invention is the provision of novel means for supporting the motor, assembled mechanism, and housing, in position for oscillation, and which position may be adjusted as to angularity as occasion demands.

More in detail the invention has in view as an objective the provision in an electric fan of a supporting ring which is adjustably mounted on a pedestal that upstands from a base and which is formed with an open section in which is pivotally mounted the electric motor and associated mechanism.

Various other more detailed objects and advantages of the invention are associated with such features as the particular manner of adjustably securing the ring to the pedestal, the pivotal mountings for the electric motor providing for the oscillation and the mechanism for causing oscillation. This will in part become apparent and in part be hereinafter stated as the description of the invention proceeds.

The invention, therefore, comprises an electric fan of the oscillating type which consists of a motor including a rotor and stator. The stator carries a plurality of shouldered stud screws which in turn carry brackets that provide aligned bearings for a shaft carrying the rotor. A two part casing encloses the motor and assembled mechanism and the casing with the mechanism enclosed therein is in turn mounted for oscillation in an open section of a ring that is adjustably mounted on a pedestal upstanding from a base.

Figure 2:
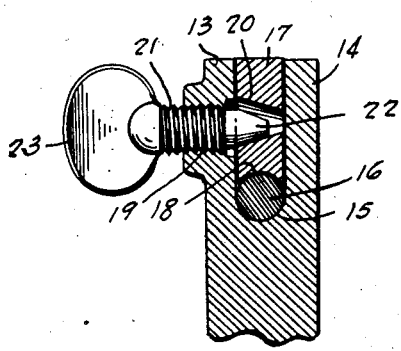
Figure 3:
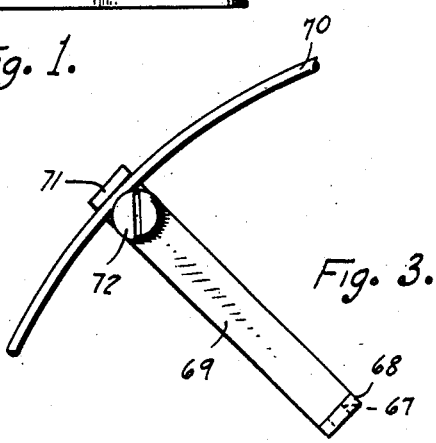

For a full and more complete understanding of the invention reference may be had to the following description and accompanying drawings, wherein Figure 1 is a side view partly in elevation and partly in section of an electric fan embodying the precepts of this invention, Figure 2 is an enlarged detailed view in section bringing out the adjustability of the ring with respect to the pedestal, Figure 3 is another enlarged detailed view in elevation bringing out the manner in which the guard for the fan blades is connected to its supporting arms, Figure 4 is a top plan view of the motor and assembled mechanism, per se, Figure 5 is an enlarged detailed view from the side developing the pivotal mounting of the motor and the mechanism for causing oscillation, and Figure 6 is an enlarged detailed plan view of the linkage which causes oscillation, and Figure 7 is a section through the casing taken on a plane normal to the showing of Figure 1.

Referring now to the drawings wherein like reference characters denote corresponding parts, the improved electric fan of this invention is shown as comprising a pedestal 10 which upstands from a base 11. The base 11 is preferably cored or hollowed out (in a manner not illustrated) so as to provide a housing for a control switch, the operating member for which is represented at 12.

The pedestal 10 terminates at its upper end in a bifurcated construction defined by walls 13 and 14, which define a groove, the bottom of which is rounded as shown at 15. Fitted between the walls 13 and 14 and engaging the rounded bottom 15 is a supporting ring 16 that is maintained in position by a filler block 17 having a lower rounded surface 18 that engages the ring 16. The wall 13 is provided with a threaded opening 19, and in approximate alignment therewith the filler block 17 is formed with a truncated conical opening 20. The screw member 21, having a conical extremity 22 which is received in the opening 20, is threaded in the threaded opening 19 and carries operating means as shown at 23. It is evident that the screw member 21 may be tightened to cause the conical extremity 22 to engage a wall of the opening 20 to urge the filler block 17 downwardly against the ring 16 to securely clamp the latter in position within the bifurcated upper end of the pedestal 10. However, upon loosening of the screw 21 the filler block 17 is correspondingly loosened to permit adjustment of the ring 16 with respect to the pedestal 10.

Referring more particularly to Figure 1 the ring 16 is shown as formed with an open section. The extremities of the ring member 16 are reduced as represented at 24 and the surfaces of the reduced portion are roughened in any desired manner as by knurling. Fitted over the reduced extremities in any approved manner, such as by die casting, are end sections 25 which are of the shape clearly shown in Figures 1 and 5. These end sections provide spaced parallel surfaces 26, between which are positioned the motor and associated mechanism for oscillation.

Projecting inwardly from each of the surfaces 26 are trunnions 27 which may be anchored to each of the end sections 25 in the manner shown in Figure 1, that is by having reduced knurled portions 28 about which are die casted end sections 25.

Referring now more particularly to Figures 1 and 4, the electric motor of the fan is shown as comprising a stator 29 which may be made from laminated punchings in a well known manner and which carry the usual windings. Extending through the stator 29 are a plurality of stud screws 30. In the illustrated embodiment of the invention, the stator is shown as carrying four of these stud screws. Each of the stud screws is shown as formed with a shoulder at 31 adjacent to each end wall. The extremities of the stud screws are threaded as represented at 32. A pair of bracket elements designated B¹ and B² respectively are shown as carried by the stud screws 30. Each of these bracket elements B¹ and B² includes a ring like member 33 that is received on the reduced extremities of the stud screws 30 and is securely clamped against the shoulders 31 by nuts 34 that are screwed on the threaded extremities of the stud screws 30. Extending outwardly from the ring structure 33 of the bracket B¹ are a plurality of extensions 35 which are turned over at their extremities and extend radially inwardly to a central meeting place where they carry a bearing element 36. In a similar manner the bracket element B² is shown as formed with a corresponding number of the extensions 35, the extremities of which are turned radially inwardly and carry a bearing element 36. It is evident that the manner of assembling the bracket members B¹ and B² on the stud screws 30 insures of a proper alignment of the bearings 36.

A shaft 37 is shown as being operatively carried by the bearings 36 and this shaft within the stator 29 carries a rotor 9 in the usual manner.

At the forward end the shaft 37 carries the several blades of an electric fan such as shown at 38, while at the opposite or rear end the shaft 37 extends beyond the bearings 36 into a gear box 38a to cause the oscillation of the motor in a manner to be hereinafter described.

The bracket B² carries a pair of braces 39 which may be secured thereto in any preferred manner as by the fastening elements shown at 40. At diametrically opposite points corresponding to the trunnions 27, the brackets 39 are formed with ears 41 which are in turn formed with bearing openings 42 which receive the reduced extremities of the trunnions 27. The walls of the ear 41 about the openings 42 may be provided with threaded openings as shown at 43. Ordinarily these openings 43 serve no function, but in the event it should be desired to permanently use the fan in a non-oscillating manner said screws may be secured into the openings 43 to engage the trunnions 27 to lock the fan against oscillation.

The gear box 38a is carried by the bearing 36 and includes a removable cover 44, which is ordinarily screwed in position by screw fastening means shown at 45 in Figure 1. The extremity of the shaft 37 which projects into the gear box 38a is provided with a worm 46 that engages a worm gear 47 carried on a cross shaft 48 that is mounted within the gear box 38a. This cross shaft 48 is in turn formed with a worm 49 that is in mesh with a worm gear 50. The latter is movably positioned about the threaded extremity 51 that upstands from a stud 52 that projects through the bottom of the gear box 38a and which drivably carries at its lower end a disc 53. Between the threaded extremity 51 and the stud 52 there is a shoulder 54 against which the worm gear 50 rests. A clutch cap 55 is shown as screwed on to the threaded extremity 51 and this clutch cap 55 is carried by a rod 56 that extends upwardly through the cover 44. At the upper end the rod 56 carries an operating member shown at 57. When the operating member 57 is rotated to screw the clutch cap downwardly, the latter engages the worm gear 50 to force the same against the shoulder 54 whereupon the worm gear 50 drives the stud gear 52 to cause rotation of the disc 53.

Pivotally connected to the disc 53, as shown at 58, is a pitman link 59, the other extremity of which is pivotally connected as shown at 60 to a stationary arm 61 which is nonrotatably carried by the lower trunnion 27. It is evident that as the disc 53 rotates, the pitman link 59 is rendered effective, due to the eccentricity of its connection at 58, to cause oscillation of the bracket B² and structure which is securely affixed thereto, such structure being the electric motor and assembled mechanism, including the fan blades 38.

The electric motor and the oscillating mechanism is housed within a two part casing represented at 62 in Figure 1. This casing 62 is preferably streamlined to afford a pleasing design and may be secured in position by set screws that pass through openings in the casing and have their ends screwed into threaded openings 63 which are formed in the extensions 35 of the bracket B². The extensions 35 of the bracket B¹ are also formed with openings through which extend screw elements 64. The inner extremities of these elements 64 are headed as shown at 65, while the outer extremities are slotted as shown at 66. These screw elements 64 pass through openings in the parts of the casing 62 and also through openings 67 formed in the feet 68 of supporting arms 69. The latter extend radially outwardly and at their outer extremities carry a guard structure 70. The mode of connecting the extremities of the supporting arms 69 to the guard 70 is illustrated in Figure 3 as comprising end flanges 71 with which cooperate headed end members 72.

The casing 2 is divided lengthwise; that is along the direction of the shaft 37 to provide two complemental parts. One of these parts is designated 62a while the other is designated 62b. It will be noted that the part 62b is formed with a peripheral flange 73 that receives therewithin the edge of the part 62a, this interfitting, together with the set screws, serving to maintain the casing assembled as a unit about the mechanisms which it houses.

It is evident that the supporting ring 16 which is preferably made from a metal having desired properties of resiliency and elasticity assures of a resilient mounting for the motor and various parts which oscillate therewith. At the same time the adjustability of the ring with respect to the pedestal provides for the ready adjustment of the angle of the fan.

While a preferred specific embodiment of the invention is hereinbefore set forth it is to be clearly understood that I am not to be limited to the exact constructions illustrated and described, because various modifications of these details may be provided in putting the invention into practice within the purview of the appended claims.

I claim:

1. In an electric fan of the character described, a shaft, a rotor carried by the shaft, a stator disposed about said rotor, a pair of brackets carried at each side of the stator and having aligned bearings receiving said shaft, a supporting ring having an open section, trunnions carried by each end of the supporting ring, and which trunnions extend into said open section, bearing braces carried by one of the first mentioned brackets receiving said trunnions to pivotally mount the rotor, stator, and associated structure in said open section, a gear box carried by the same bracket which carries the bearing braces, and gear mechanism within said box causing oscillation of the rotor, stator, and associated mechanism.

2. In an electric fan of the character described, a shaft, a rotor carried by the shaft, a stator disposed about said rotor, a pair of brackets carried at each side of the stator and having aligned bearings receiving said shaft, a supporting ring having an open section, trunnions carried by each end of the supporting ring and which trunnions extend into said open section, bearing braces carried by one of the first mentioned brackets receiving said trunnions to pivotally mount the rotor, stator, and associated structure in said open section, a gear box carried by the same bracket which carries the bearing braces, an arm extending from one of the trunnions, a pitman pivotally connected to said arm, said pitman being eccentrically and pivotally connected at its other end to a disc, and means within said gear box for driving said disc from the said shaft.

3. In an electric fan including a shaft, a rotor carried by the shaft, a stator, and mechanism for oscillating said shaft, rotor and stator, a two part casing for housing said rotor, stator and oscillating mechanism, said casing being divided along a plane that extends in substantially the same direction as said shaft, one of said casing parts including a peripheral flange which receives and encloses the peripheral edge of the other casing part.

4. In an electric fan including a shaft, a rotor carried by the shaft, a stator disposed about said rotor, and brackets carried by said stator and formed with bearings receiving said shaft, a casing comprising two interfitting parts joined together on a plane extending in substantially the same direction as said shaft, and means for securing said casing parts to said brackets.

PATRICK J. FITZGERALD.